United States Patent [19]

Baldwin

[11] 4,375,908

[45] Mar. 8, 1983

[54] ANAMORPHIC SYSTEM FOR REDUNDANCY IN COHERENT FIBER OPTIC BUNDLE TRANSMISSION

[75] Inventor: Dorothy M. Baldwin, Lake Monroe, Fla.

[73] Assignee: The United States of America as represented by the Secretary of the Navy, Washington, D.C.

[21] Appl. No.: 245,485

[22] Filed: Mar. 19, 1981

[51] Int. Cl.$^3$ .................................................. G02B 5/17
[52] U.S. Cl. .................................... 350/96.25; 350/294
[58] Field of Search ...................... 350/96.25, 294, 504, 350/505

[56] References Cited

U.S. PATENT DOCUMENTS

| | | | |
|---|---|---|---|
| 3,110,762 | 11/1963 | Frank | 350/96.25 |
| 3,142,235 | 7/1964 | Siegmund | 350/96.25 |
| 3,217,588 | 11/1965 | Chitayat | 350/96.25 |
| 3,549,803 | 12/1970 | Becht et al. | 350/294 |
| 3,748,016 | 7/1973 | Rossire | 350/96.25 |
| 3,762,794 | 10/1973 | Arnaud | 350/294 |
| 4,154,502 | 5/1979 | Siegmund | 350/96.26 |
| 4,156,556 | 5/1979 | Klein et al. | 350/294 |
| 4,310,849 | 1/1982 | Glass | 350/96.15 |

Primary Examiner—John D. Lee
Assistant Examiner—Frank Gonzalez
Attorney, Agent, or Firm—Robert F. Beers; Robert W. Adams; David S. Kalmbaugh

[57] ABSTRACT

An optical transmission system for eliminating picture element information loss during the transmission of a circular image forming light beam through a fiber optics bundle. Included in the optical transmission system is an image source which emits the image forming light beam, a first pair of cylindrical shaped mirrors adapted for amplifying the image forming light beam in a predetermined direction such that it will assume an elliptical configuration, and the fiber optics bundle which transmits the image forming light beam from the first pair of cylindrical shaped mirrors to a second pair of cylindrical shaped mirrors. The second pair of cylindrical shaped mirrors, in turn, reduce the image forming light beam to a circular configuration so as to allow for the broadcasting of the image forming light beam upon a reflective display screen such that a visual image is formed upon the reflective display screen. Breakage of one or more fibers within the fiber optics bundle will not distort the visual image broadcast upon the reflective display screen since the image forming light beam was amplified by the first pair of cylindrical shaped mirrors prior to being transmitted through the fiber optics bundle.

10 Claims, 3 Drawing Figures

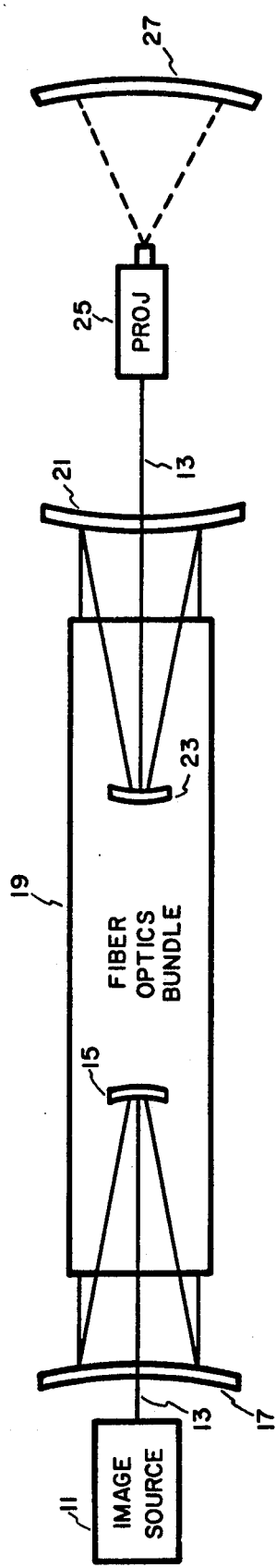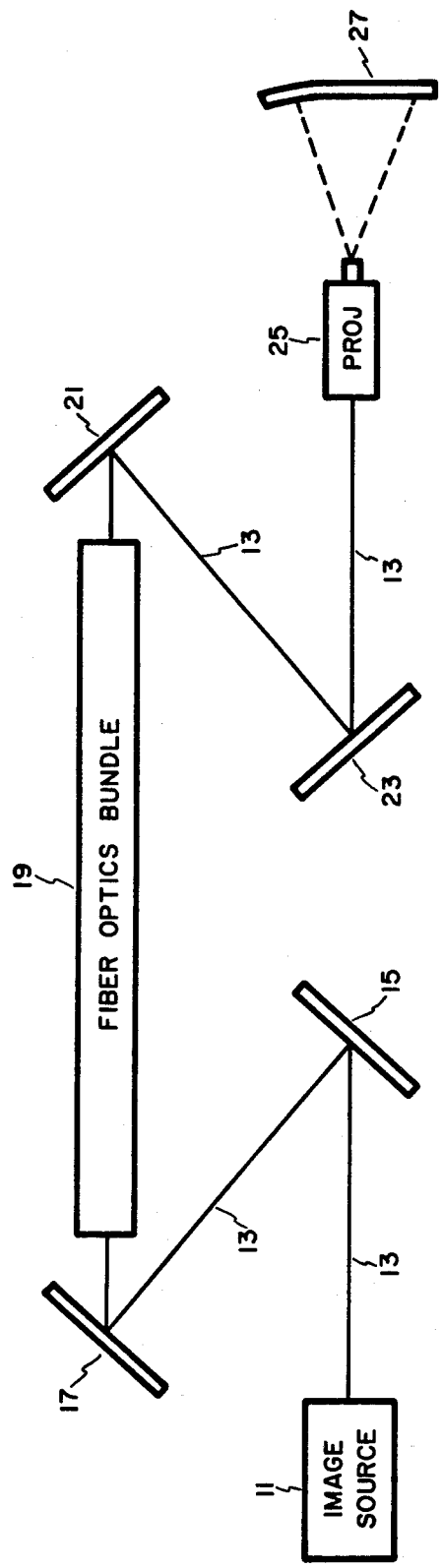

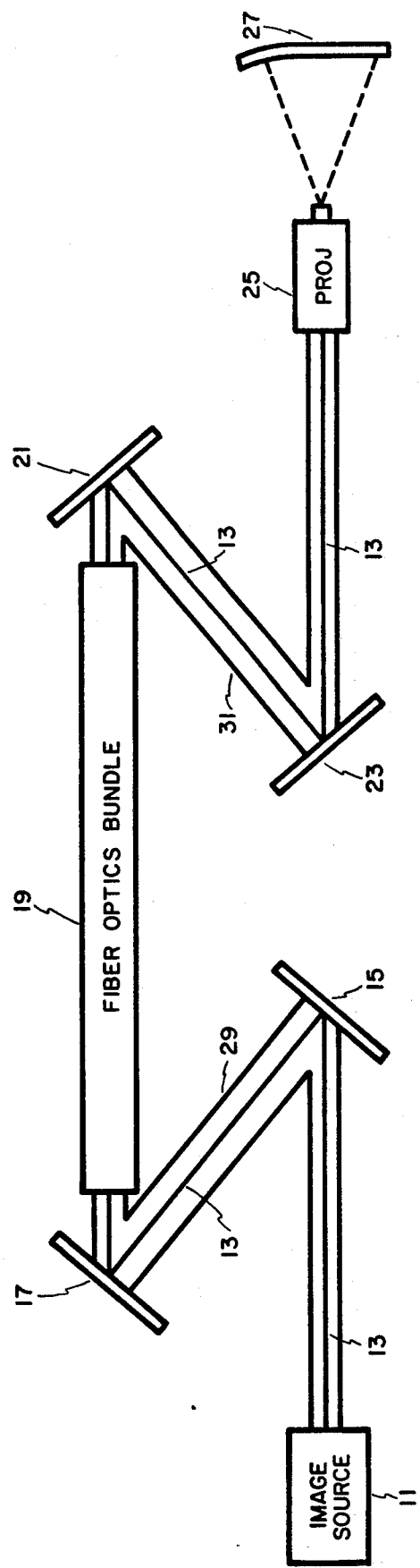

ANAMORPHIC SYSTEM FOR REDUNDANCY IN COHERENT FIBER OPTIC BUNDLE TRANSMISSION

BACKGROUND OF THE INVENTION

1. Field of the Invention

This invention relates generally to the transmission of light. In particular, this invention relates to an optical transmission system for eliminating picture element information loss during the transmission of image forming light through a fiber optics bundle.

2. Description of the Prior Art

Heretofore numerous fiber optics image transmitting systems have been utilized in training simulators and the like to transmit visual image forming light from a source to a display apparatus such that a visual image will appear on the display apparatus. However, in the transmission of image forming light, breakage of individual fibers and transmission variations between adjoining fibers, especially over long distances, will result in severe image deterioration of the visual image appearing on the aforementioned display apparatus, such that an unrealistic training environment will be presented to a trainee.

A variety of prior art devices have been utilized to correct for image deterioration while transmitting image forming light from a light source to a display apparatus. For example, U.S. Pat. No. 4,154,502 to W. P. Siegmund discloses a fiber optic image transmitter which receives an image produced by a fiber scope objective and transmits the image to the image receiving end of the flexible fiber optic bundle of the fiberscope. The image transmitter is oscillated about an axis normal to its direction of image transmission for causing images transmitted thereby to scan across the image receiving end of the fiberscope bundle. Synchronous scanning of the opposite image emitting end of the fiberscope bundle renders the received images stationary and of enhanced resolution.

U.S. Pat. No. 3,217,588 to A. K. Chitayat discloses a fiber optical image enhancement device which utilizes synchronous motor means for nutating an image at the beginning of a fiber optic cable and phase locked synchronous motor means for nutating the image at the output of the cable. This, in turn, results in the image transmitted through the cable remaining stationary, thereby providing for an enhanced image at the output of the cable.

U.S. Pat. No. 3,110,762 discloses an apparatus for improving images which consist of an image transmission system and movable light-displacing elements in the path of light entering the input end and leaving the output end of the transmission system. The effect of the light-displacing elements is to displace the axis of the image carrying light beam laterally repetitively and in synchronism relative to the raster of the input or pick-up element and the output element of the light transmission system by means of coordinated movement between the light displacing elements.

The aforementioned devices of the prior art while satisfactory for their intended purpose, that of image transmission, ordinarily leave something to be desired, especially from the standpoints of image enhancement accuracy, design complexity, and transmission efficiency. In addition, the aforementioned devices of the prior art do not operate exactly the same as the subject invention, and contain a combination of elements that is somewhat different from that of the present invention.

SUMMARY OF THE INVENTION

The subject invention overcomes some of the disadvantages of the prior art including those mentioned above in that it comprises a relatively simple image transmission system which may be utilized to transmit image forming light over long distances without image deterioration due to fiber structure and broken fibers within the system.

Included in the subject invention is an image source which broadcasts from the optical output thereof a narrow circular beam of image forming light, and a first pair of cylindrical shaped mirrors adopted for amplifying the image forming light beam such that the aforementioned image forming light beam will assume an elliptical configuration. The image forming light beam is then passed through a fiber optics bundle to a second pair of cylindrical shaped mirrors which, in turn, reduce the image forming light beam to a circular configuration so as to allow for the broadcasting thereof by a projector upon a reflective display screen such that a visual image will appear upon the reflective display screen.

Breakage of one or more fibers within the fiber optics bundle will reduce only the light intensity of certain parts of the visual image broadcast upon the reflective display screen, since the image forming light beam was amplified during transmission through the fiber optics bundle by the aforementioned first pair of mirrors.

BRIEF DESCRIPTION OF THE DRAWINGS

FIG. 1 is a top view of the image transmission system constituting the subject invention;

FIG. 2 is a side view of the image transmission system of FIG. 1; and

FIG. 3 is a modified image transmission system embodying the subject invention.

DESCRIPTION OF THE PREFERRED EMBODIMENT

The preferred embodiment of the subject invention will now be discussed in conjunction with all of the figures of the drawing wherein like parts are designated by like reference numerals insofar as it is practical to do so.

Referring now to FIGS. 1 and 2, there is shown on image source 11 adapted for emitting along a first optical or light path a narrow circular beam of image forming light 13, which has therein a plurality of picture elements and may be, for example, laser light, infrared light, or the like.

At this time, it may be noteworthy to mention that image source 11 may be, for example, an image generator of the type disclosed in U.S. patent application Ser. No. 104,521, now U.S. Pat. No. 4,348,186, entitled Pilot Helmet Mounted CIG Display with Eye Coupled Area of Interest by J. F. Harvey, W. S. Chambers, J. J. Kulik.

Spatially disposed downstream from image source 11 along the aforementioned first optical path is a cylindrical shaped mirror 15, the radius of which is approximately eight millimeters. A cylindrical shaped mirror 17 is spatially disposed upstream from cylindrical shaped mirror 15 on a second predetermined light path, the latter light path of which makes substantially a 39° angle with the above mentioned first light path due to the redirecting capability of cylindrical shaped mirror 15. Cylindrical shaped mirror 17, in turn, has a radius of approximately 240 millimeters. In addition, the focal points of mirrors 15 and 17 are coincident.

At this time, it should be noted that the combination of cylindrical shaped mirrors 15 and 17 amplify each picture element of image forming light beam 13 by a factor of thirty, only in the plane of FIG. 1, in accordance with the relationship $$M = R_2/R_1 \quad (1)$$

where M is the magnification factor, $R_1$ is the radius of mirror 15 and $R_2$ is the radius of mirror 17. This, in turn, will result in image forming light 13 assuming an elliptical configuration upon being redirected by mirror 17 as will be discussed more fully below.

The optical input of a fiber optics bundle 19 is spatially disposed downstream from cylindrical shaped mirror 17 along a third predetermined light path, the latter light path of which is parallel to the above mentioned first light path and makes an angle of substantially 39° with the aforesaid second light path due to the redirecting capability of cylindrical shaped mirror 17.

Fiber optics bundle 19 includes a plurality of fiber rows with each fiber row, in turn, having thirty fibers therein due to the magnification factor, in accordance with relationship (1) above, of cylindrical shaped mirrors 15 and 17. Fiber optics bundle 19 may, of course, be any conventional and commercially available fiber optics light guide. In particular, the fiber optics light guide Model Number FS-163 manufactured by American Optical Corporation of Southbridge, Mass., performs quite satisfactorily as fiber optics bundle 19. In addition, fiber optics bundle 19 is flexible and may be taken around bends and corners as dictated by the display system in which the subject invention is utilized.

Spatially disposed downstream from the optical output of fiber optics bundle 19 along the aforementioned third light path is a cylindrical shaped mirror 21, the radius of which is approximately 240 millimeters. A cylindrical shaped mirror 23 is spatially disposed upstream from cylindrical shaped mirror 21 on a fourth predetermined light path, the latter light path of which makes substantially a 39° angle with the aforesaid third light path due to the redirecting capability of cylindrical shaped mirror 21. In addition, mirror 23 has a radius of approximately eight millimeters, and the focal points of mirrors 21 and 23 are coincident.

It should be noted at this time that the combination of cylindrical shaped mirrors 21 and 23 reduce the magnification of each picture element of image forming light beam 13 by a factor of thirty only in the plane of FIG. 1, in accordance with the relationship $$M = R_2/R_1 \quad (2)$$

where M is the magnification factor, $R_1$ is the radius of mirror 21, and $R_2$ is the radius of mirror 23. This, in turn, will result in image forming light beam 13, upon being redirected by mirror 23, assuming a circular configuration, the diameter of which is identical to the diameter thereof upon being emitted from image source 11.

The optical input of a projector 25 is spatially disposed downstream from cylindrical shaped mirror 23 along a fifth light path, the latter light path of which is in alignment with the aforesaid first light path and makes an angle of substantially 39° with the aforementioned fourth light path due to the redirecting capability of cylindrical shaped mirror 23. Positioned adjacent the optical output of projector 25 along the aforesaid fifth optical path is a reflective display screen 27, the function of which is to form a visual image thereon in response to the broadcasting of image forming light beam 13 by projector 25.

It may be noteworthy to mention at this time that projector 25 may be a helmet mounted projector of the type described in the aforementioned U.S. patent application Ser. No. 104,521. In addition, screen 27 may be any conventional well known, and commercially available reflective display screen.

Referring now to FIG. 3, there is shown a modified image transmission system embodying the subject invention. Positioned adjacent the optical output of image source 11 is the optical input of a glass transmission member 29, the optical output of which is positioned adjacent the optical input of fibers optics bundle 19. The remainder of glass transmission member 29 extends along the aforesaid first, second, and third light paths from the optical input to the optical output thereof.

Similarly, there is positioned adjacent the optical output of fiber optics bundle 19, the optical input of a glass transmission member 31, the optical output of which is positioned adjacent the optical input of projector 25. The remainder of glass transmission member 31 extends along the aforesaid third, fourth, and fifth light paths from the optical input to the optical output thereof.

The utilization of glass transmission members 29, and 31 within the subject invention will, in turn, significantly reduce light loss due to beam spread along the aforesaid first, second, third, fourth, and fifth optical paths, since glass will reduce the cone angle of light and therefore reduce light losses caused by vignetting. This, in turn, results in a significant improvement in the resolution of the visual image broadcast upon screen 27.

The operation of the subject invention will now be discussed in conjunction with all of the figures of the drawing.

Referring first to FIGS. 1 and 2, image source 11 broadcast narrow circular beam of image forming light 13 along the aforesaid first optical path to cylindrical shaped mirror 15. Cylindrical shaped mirror 15 then redirects image forming light beam 13 along the above mentioned second optical path to cylindrical shaped mirror 17 which, in turn, will redirect image forming light beam 13 along the aforementioned third optical path such that image forming light 13 will pass through fiber optics bundle 19 to cylindrical shaped mirror 21. In addition, the combination of cylindrical shaped mirrors 15 and 17 amplify each picture element of image forming light beam 13 by a factor of thirty in the plane of FIG. 1, in accordance with relationship one above, such that image forming light beam 13 will assume an elliptical configuration upon passing through the fibers of fiber optics bundle 19.

Cylindrical shaped mirror 21 redirects image forming light beam 13 along the aforesaid fourth optical path to cylindrical shaped mirror 23 which, in turn, redirects image forming light beam 13 along the aforementioned fifth optical path to the optical input of projector 25. In addition, the combination of cylindrical shaped mirrors 21 and 23 reduce the magnification of each picture element of image forming light beam 13 by a factor of thirty in the plane of FIG. 1, in accordance with relationship 2 above. This, in turn, will result in image forming light beam 13, upon being redirected by mirror 23 along the aforesaid fifth optical path, assuming a circular configuration, the diameter of which is equal to the diameter thereof upon being emitted from image source 11.

Projector 25, upon receiving image forming light beam 13 at the optical input thereof, will broadcast upon reflective display screen 27 a visual image such that an observer, not shown, may observe the aforementioned visual image.

Breakage of one or more fibers within one of the fiber rows of fiber optics bundle 19 will prevent the passage of light through the aforementioned broken fibers. This, in turn, will result in a reduction of the intensity of light passing through a fiber row of fiber optics bundle 19 which has broken fibers therein. Thus, for example, when ten fibers within one of the fiber rows of fiber optics bundle 19 are broken, the intensity of the light passing therethrough will be reduced by thirty-three percent. Accordingly, the visual image broadcast upon reflective display screen 27 will not become distorted due to the breakage of some of the fibers within fiber optics bundle 19 since each picture element of image forming light beam 13 has been amplified by the combination of mirrors 15 and 17, as discussed above. Only the light intensity of some of the picture elements of image forming light beam 13 will be reduced, thereby reducing the light intensity of certain parts of the visual image broadcast upon reflective display screen 27.

Referring now to FIGS. 1 and 3, utilization of glass transmission members 29, and 31 between the optical output of image source 13 and the optical input of projector 27 will significantly reduce light loss due to the beam spread of image forming light beam 13 along the aforementioned first thru fifth light path since glass reduces the cone angle of light and therefore reduces light loss caused by vignetting. This, in turn, will result in a significant improvement in the brightness of the visual image broadcast upon reflective display screen 27.

From the foregoing, it may readily be seen that the subject invention comprises a new, unique, and exceedingly useful image forming light transmission system which constitutes a considerable improvement over the known prior art. Obviously, many modifications and variations of the present invention are possible in light of the above teachings. It is, therefore, to be understood that within the scope of the appended claims the invention may be practiced otherwise than as specifically described.

What is claimed is:

1. An anamorphic system for redundancy in coherent fiber optic bundle transmission comprising, in combination:
    image source means having an optical output for projecting an image forming light beam along a first optical path, said image forming light beam having a circular configuration and a plurality of picture elements therein;
    enlarging means spatially disposed downstream from the optical output of said image source means along said first optical path adapted for redirecting said image forming light beam along a second optical path having a predetermined angle with said first optical path, and a third optical path having a predetermined angle with said second optical path so as to amplify each picture element of said image forming light beam in a predetermined direction such that said image forming light beam will assume an elliptical configuration;
    fiber optic bundle transmitting means having a plurality of fiber rows, each fiber row of which has therein a plurality of fibers, an optical input, and an optical output, with the optical input thereof spatially disposed downstream from said enlarging means along said thrid optical path adapted for receiving and passing therethrough said image forming light beam;
    contracting means spatially disposed downstream from the optical output of said fiber optic bundle transmitting means along said third optical path adapted for redirecting said image forming light beam along a fourth optical path having a predetermined angle with said third optical path and a fifth optical path having a predetermined angle with said fourth optical path so as to reduce each picture element of said image forming light beam in said predetermined direction such that said image forming light beam will reassume said circular configuration;
    a reflective display screen spatially disposed downstream from said contracting means along said fifth optical path; and
    projecting means positioned between said contracting means and said reflective display screen along said fifth optical path adapted for broadcasting upon said reflective display screen, in response to said image forming light beam, a visual image which is not distorted due to the breakage of one or more fibers within any fiber row of said fiber optics bundle, since each picture element of said image forming light beam has been amplified during passage through said fiber optics bundle transmitting means.

2. The anamorphic system of claim 1 wherein said image forming light beam comprises laser light.

3. The anamorphic system of claim 1 wherein said enlarging means comprises:
    a first cylindrical shaped mirror spatially disposed downstream from the optical output of said image source means along said first optical path; and
    a second cylindrical shaped mirror spatially disposed upstream from said first cylindrical shaped mirror along said second optical path.

4. The anamorphic system of claim 1 wherein said contracting means comprises:
    a first cylindrical shaped mirror spatially disposed downstream from the optical output of said fiber optics bundle transmitting means along said third optical path; and
    a second cylindrical shaped mirror spatially disposed downstream from said first cylindrical shaped mirror along said fourth optical path.

5. The anamorphic system of claim 1 further characterized by first and second glass transmission members, the first glass transmission member of which is positioned between the optical output of said image source means and the optical input of said fiber optics bundle transmitting means along said first, second, and third optical paths, and the second glass transmission member of which is positioned between the optical output of said fiber optics bundle transmitting means and said projecting means along said third, fourth, and fifth optical paths.

6. An optical transmission system comprising, in combination:

an image source having an optical output adapted for projecting an image forming light beam along a first predetermined optical path;

a first cylindrical shaped mirror spatially disposed downstream from the optical output of said image source along said first predetermined optical path;

a second cylindrical shaped mirror spatially disposed upstream from said first cylindrical shaped mirror along a second predetermined optical path having a predetermined angle with said first optical path;

a fiber optics bundle having a plurality of fiber rows, each fiber row of which has therein a plurality of fibers, an optical input, and an optical output, with the optical input of said fiber optics bundle spatially disposed downstream from said second cylindrical shaped mirror along a third predetermined optical path having a predetermined angle with said second optical path such that said third optical path is parallel to said first optical path;

a third cylindrical shaped mirror spatially disposed downstream from the optical output of said fiber optics bundle along said third optical path;

a fourth cylindrical shaped mirror spatially disposed upstream from said third cylindrical shaped mirror along a fourth predetermined optical path having a predetermined angle with said third optical path; and a projector having a optical input and an optical output with the optical input thereof spatially disposed downstream from said fourth cylindrical shaped mirror along a fifth predetermined optical path having a predetermined angle with said fourth optical path such that said fifth optical path is parallel to said third optical path.

7. The optical transmission system of claim 6 wherein said image forming light comprises laser light.

8. The optical transmission system of claim 6 wherein said plurality of fibers within each fiber row of said fiber optics bundle comprises thirty fibers within each fiber row of said fiber optics bundle.

9. The optical transmission system of claim 6 further characterized by first and second glass transmission members, the first glass transmission member of which is positioned between the optical output of said image source and the optical input of said fiber optics bundle along said first, second and third optical paths, and the second glass transmission member of which is positioned between the optical output of said fiber optics bundle and the optical input of said projector along said third, fourth, and fifth optical paths.

10. The optical transmission system of claim 6 further characterized by a reflective display screen positioned adjacent the optical output of said projector.

* * * * *